US009692818B2

(12) United States Patent
Ogrinz (10) Patent No.: US 9,692,818 B2
(45) Date of Patent: Jun. 27, 2017

(54) AUTOMATED APPLICATION DEPLOYMENT BASED ON SERVER UTILIZATION

(71) Applicant: BANK OF AMERICA CORPORATION, Charlotte, NC (US)

(72) Inventor: Michael Emil Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 630 days.

(21) Appl. No.: 14/250,451

(22) Filed: Apr. 11, 2014

(65) Prior Publication Data

US 2015/0296007 A1    Oct. 15, 2015

(51) Int. Cl.
*G06F 15/16* (2006.01)
*H04L 29/08* (2006.01)
*H04L 12/26* (2006.01)

(52) U.S. Cl.
CPC .......... *H04L 67/1025* (2013.01); *H04L 43/08* (2013.01)

(58) Field of Classification Search
CPC .......................... H04L 67/1025; H04L 43/08
See application file for complete search history.

(56) References Cited

U.S. PATENT DOCUMENTS

| | | | | |
|---|---|---|---|---|
| 5,687,372 A * | 11/1997 | Hotea | | H04L 29/06 709/201 |
| 8,433,804 B2 * | 4/2013 | Swanburg | | H04L 65/40 709/229 |
| 8,745,177 B1 * | 6/2014 | Kazerani | | H04L 43/08 709/220 |
| 9,021,566 B1 * | 4/2015 | Panayotopoulos | | G06F 21/50 713/168 |
| 2012/0047239 A1 * | 2/2012 | Donahue | | G06F 9/5072 709/220 |
| 2012/0303694 A1 * | 11/2012 | He | | H04L 43/0817 709/203 |
| 2013/0152072 A1 * | 6/2013 | Fernandez-Ruiz | | G06F 8/60 717/175 |

* cited by examiner

*Primary Examiner* — Richard G Keehn
(74) *Attorney, Agent, or Firm* — Michael A. Springs; Moore & Van Allen PLLC; Nicholas C. Russell

(57) ABSTRACT

Embodiments disclosed herein relate to systems, methods, and computer program products for deploying an application in a networked server environment. In some embodiments, the method monitors server metrics and deploys the application according to prioritization criteria associated with the application. The system, method, and computer program product are configured to identify a plurality of servers connected via a network; monitor a plurality of metrics associated with each server, wherein the metrics are associated with server performance or server communication over the network; receive a request to deploy an application on at least one of the servers, wherein the prioritization criteria rank the metrics in order of importance to the application; determine a deployment server for the application based at least in part on the metrics and the prioritization criteria; and deploy the application to the deployment server.

8 Claims, 3 Drawing Sheets

FIG. 3

AUTOMATED APPLICATION DEPLOYMENT BASED ON SERVER UTILIZATION

BACKGROUND

Typically, software deployment is a straightforward process. Target hardware is identified and software is manually or automatically copied to the hardware. In some situations, load balancing is used to deploy an application to multiple servers in order to reduce the burden on any single server.

Installation of software or applications on a server may have unintended consequences. For example, the application may not be appropriate for the server based on the server's performance characteristics. The server may have a large amount of free memory but a slow processer. Deploying an application that requires a fast processor to the server may result in the application running inefficiently. In some embodiments, deploying an application on a server results in the application affecting the network environment, such as by slowing down communication between the servers on the network.

There is currently no way to match the characteristics of the servers with the requirements of the application and therefore applications are inefficiently deployed in a network environment.

Thus, there is a need for a system and method that deploy applications to servers based on criteria provided by a user.

BRIEF SUMMARY

The following presents a simplified summary of one or more embodiments of the disclosure in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments disclosed herein address the above needs and/or achieve other advantages by providing an apparatus (e.g., a system, computer program product, and/or other device) and a computer-implemented method for deploying an application in a networked server environment. In some embodiments, the system and method receive prioritization criteria for an application from a user and compare the criteria to metrics of performance for servers in the network. The system then identifies a server for deployment of the application based on the comparison. In some embodiments, the system automatically deploys the application to the selected server and provides an obscured address for the location of the address, similar to a URL redirector.

In a first aspect, an apparatus for deploying an application in a networked server environment is provided, whereby the apparatus monitors server metrics and deploys the application according to prioritization criteria associated with the application. In some embodiments, the apparatus includes a memory; a computing processor; and a module stored in the memory, said module comprising instruction code executable by one or more computing processors, and configured to cause the one or more computing processors to: identify a plurality of servers connected via a network; monitor a plurality of metrics associated with each server in the plurality of servers, wherein the metrics are associated with server performance or server communication over the network; receive a request to deploy an application on at least one of the servers, wherein the application is a program that will be executed on the server once deployed; receive prioritization criteria for the application, wherein the prioritization criteria rank the metrics in order of importance to the application; determine a deployment server for the application based at least in part on the metrics and the prioritization criteria; and deploy the application to the deployment server.

In an embodiment, the prioritization criteria are based on at least one test of the application performed on a server when performance of the server is intentionally varied, whereby application performance is correlated to varied server performance. In some embodiments, the metrics are selected from the group consisting of CPU utilization, memory utilization, free disk space, and processor speed. In an embodiment, the determination of the deployment server is also based at least in part on the effect of the application on the network. In further embodiments, said module further comprises instruction code executable by one or more computing processors, and configured to cause the one or more computing processors to: monitor an effect of the deployment of the application to a current deployment server; and re-deploy the application to a different deployment server. In an embodiment, the application is re-deployed to the different deployment server when an effect of the application on the current deployment server is determined to be negative. In some embodiments, the network location identifier is obscured, wherein the user can direct to the obscured network location identifier but not know the physical location of the server.

In a second aspect, a computer program product for deploying an application in a networked server environment is provided, whereby the computer program product monitors server metrics and deploys the application according to prioritization criteria associated with the application. In some embodiments, the computer program product includes a non-transitory computer-readable medium comprising: an executable portion for causing a computer to identify a plurality of servers connected via a network; an executable portion for causing a computer to monitor a plurality of metrics associated with each server in the plurality of servers, wherein the metrics are associated with server performance or server communication over the network; an executable portion for causing a computer to receive a request to deploy an application on at least one of the servers, wherein the application is a program that will be executed on the server once deployed; an executable portion for causing a computer to receive prioritization criteria for the application, wherein the prioritization criteria rank the metrics in order of importance to the application; an executable portion for causing a computer to determine a deployment server for the application based at least in part on the metrics and the prioritization criteria; and an executable portion for causing a computer to deploy the application to the deployment server.

In a third aspect, a computer-implemented method for deploying an application in a networked server environment is provided, whereby the method monitors server metrics and deploys the application according to prioritization criteria associated with the application. In some embodiments, the method includes identifying a plurality of servers connected via a network; monitoring a plurality of metrics associated with each server in the plurality of servers, wherein the metrics are associated with server performance or server communication over the network; receiving a request to deploy an application on at least one of the servers, wherein the application is a program that will be executed on the server once deployed; receiving prioritization criteria for the application, wherein the prioritization criteria rank the metrics in order of importance to the application; determining, via a computing device processor, a deployment server for the application based at least in part on the metrics and the prioritization criteria; and deploying the application to the deployment server.

Other aspects and features, as recited by the claims, will become apparent to those skilled in the art upon review of the following non-limited detailed description of the disclosure in conjunction with the accompanying figures.

BRIEF DESCRIPTION OF THE SEVERAL VIEWS OF THE DRAWINGS

Having thus described embodiments in general terms, reference will now be made to the accompanying drawings, which are not necessarily drawn to scale, and wherein:

DETAILED DESCRIPTION

Embodiments will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire method and system on their own computer systems or even a single work station if appropriate databases are present and can be accessed.

Figure 1:
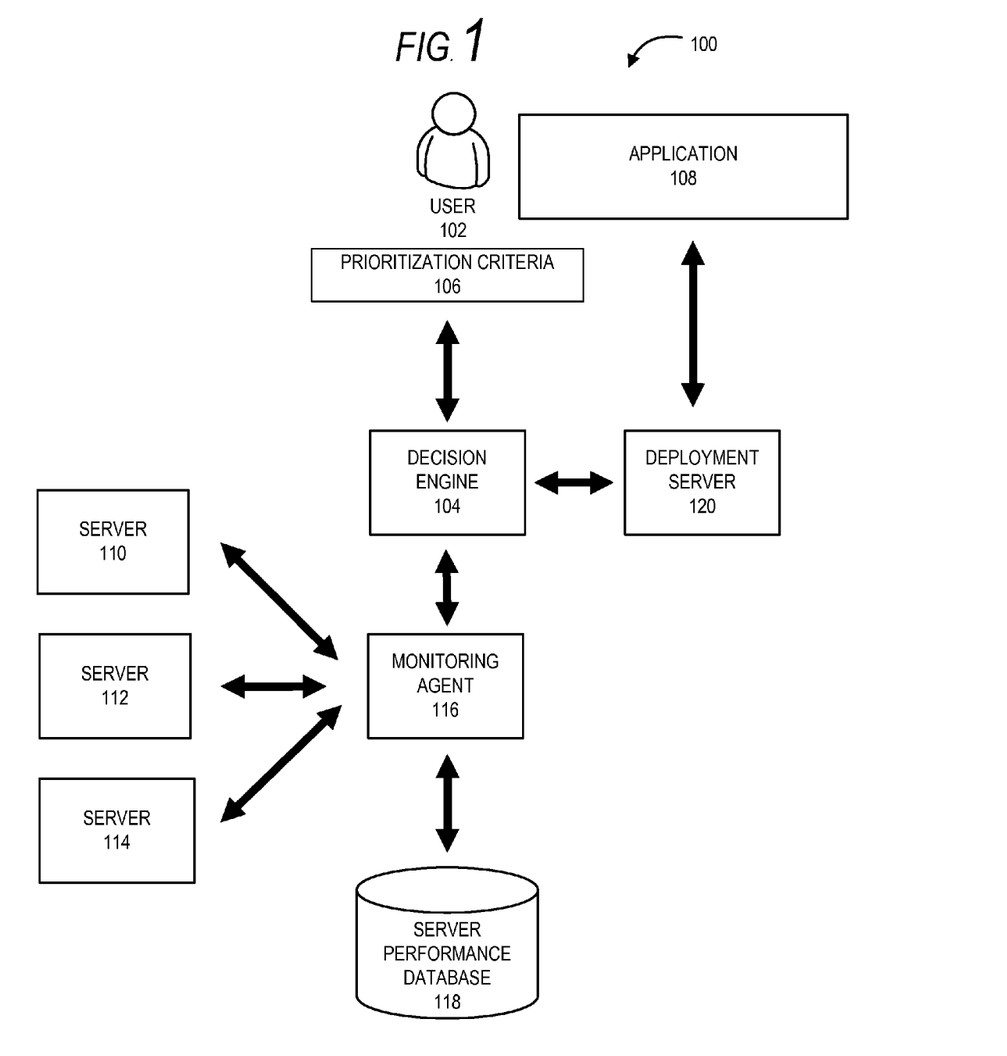
FIG. 1 provides an application deployment system environment wherein the application deployment system is used in association with a networked server environment to identify a server for deployment of an application, in accordance with one embodiment of the present disclosure.

FIG. 1 illustrates an environment 100 in which a user 102 may deploy an application to a server over a network, as well as how the processing devices associated with the networked server environment interact to determine a deployment server for the application. In an embodiment, the system includes a decision engine 104 that receives prioritization criteria 106 from the user 102. The prioritization criteria 106 are characteristics of a server or networked environment that are important to the efficient and/or proper functioning of an application 108. In an embodiment, the decision engine 104 receives the prioritization criteria 106 from the user 102 and also receives metrics on the performance of a plurality of servers 110, 112, 114 from a monitoring agent 116. The metrics are measures of the performance of the servers 110, 112, 114. In some embodiments, the monitoring agent 116 provides the metrics directly to the decision engine 104 but in some embodiments the monitoring agent 116 stores the metrics in a server performance database 118 for later access by the decision engine 104.

In an embodiment, the decision engine 104 compares the prioritization criteria 106 for the application 108 to the metrics monitored by the monitoring agent 116 and determines a deployment server 120 to which the application is deployed 108. For example, the system may determine that processing speed is most important for the application based on input from the user and determine that a specific server on the network has the highest processing speed, thereby determining the appropriate server for deployment of the application. Various other issues may be considered by the system when determining which server should be selected as the deployment server, including the effect on the server itself and the effect on the network.

Additional embodiments will now be described in further detail in order to provide additional concepts and examples related to how applications may be deployed in a networked server environment in accordance with additional embodiments of the disclosure.

Figure 2:
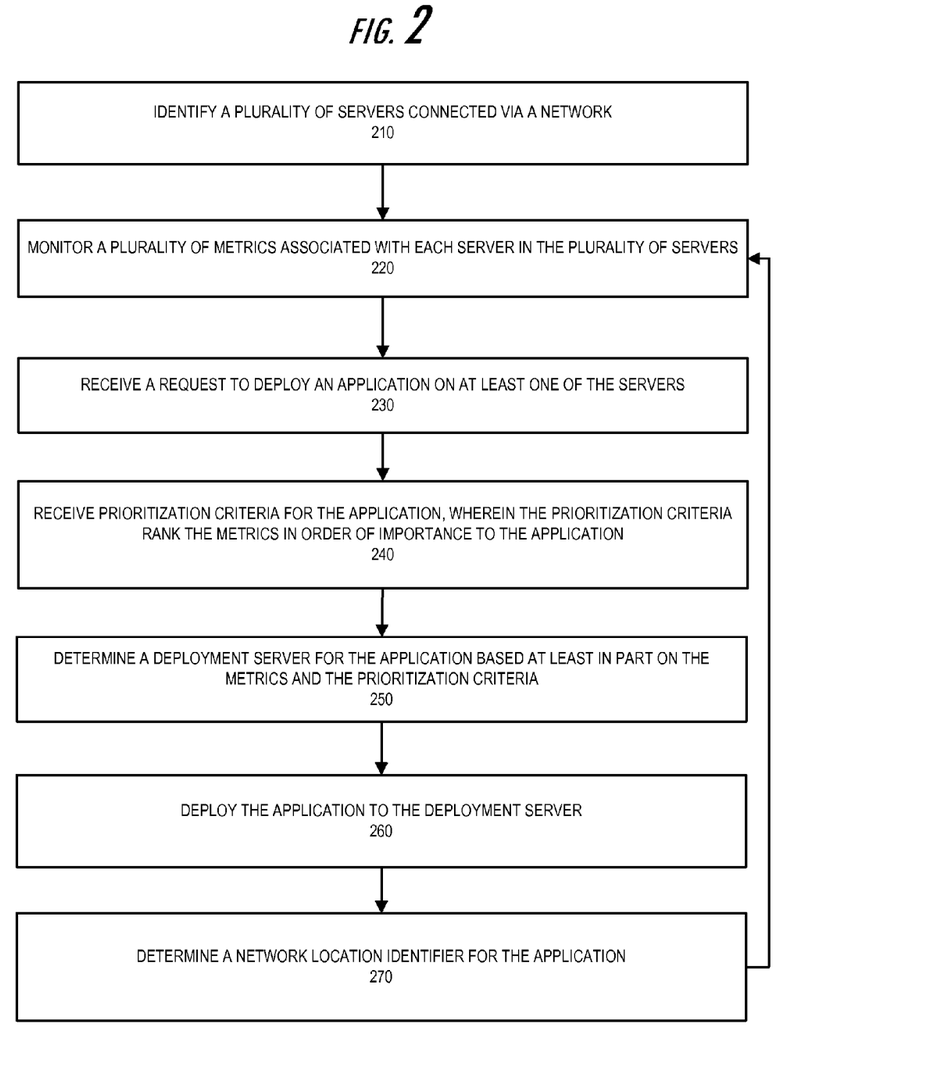
FIG. 2 provides an application deployment process in which a user may input prioritization criteria for an application in order to efficiently deploy the application in a networked server environment, in accordance with one embodiment of the present disclosure.

Turning now to FIG. 2, a system and method are disclosed for deploying an application in a networked server environment. In an embodiment, the apparatus monitors server metrics and deploys the application according to prioritization criteria associated with the application. In some embodiments, the system and method deploy the application in the networked server environment by identifying a plurality of servers connected via a network; monitoring a plurality of metrics associated with each server in the plurality of servers, wherein the metrics are associated with server performance or server communication over the network; receiving a request to deploy an application on at least one of the servers, wherein the application is a program that will be executed on the server once deployed; receiving prioritization criteria for the application, wherein the prioritization criteria rank the metrics in order of importance to the application; determining a deployment server for the application based at least in part on the metrics and the prioritization criteria; and deploying the application to the deployment server.

In block 210, the system identifies a plurality of servers connected via a network. In an embodiment, a plurality of servers is a group of interconnected computing device processors and/or memory units. Many institutions from financial institution to home networks may comprise a plurality of servers connected via a network. In an exemplary embodiment, the plurality of servers are computing device processors of an institution that are all connected and capable of hosting an application that will run on the server and/or affect the server and/or other servers or front-end devices associated with the network.

In an embodiment, the system identifies the plurality of servers based on communication received over the network. For example, the system may ping the servers in order to identify which servers are online. In some embodiments, the network is identified via a program or application. In some embodiments, the physical structure of the network is used to identify the plurality of servers.

In an embodiment, the plurality of servers is connected via two-way communication channels. For example, every server on the network may be able to receive information and send information to at least one other server on the network. In some embodiments, every server on the network is capable of communicating with every other server on the network directly. In further embodiments, one or more of servers on the network is only capable of one-way communication on the network. For example, one of the servers may only be able to receive data from other servers on the network and be unable to send data to other servers on the network.

In an embodiment, a network is a wired and/or wireless communication channel that permits data to transfer from one server to another server. In an embodiment, the network may be a global area network (GAN), such as the Internet, a wide area network (WAN), a local area network (LAN), or any other type of network or combination of networks. The network may provide for wireline, wireless, or a combination of wireline and wireless communication between devices on the network.

In block 220, the system monitors a plurality of metrics associated with each server in the plurality of servers. In some embodiments, the metrics are associated with server performance or server communication over the network. In an embodiment, a metric is a measurement of the performance of the server. The metric may be a general measurement of performance, such as processing speed, or a specific measure of performance, such as performance of a specific application. In some embodiments, the metric includes latency, throughput, and/or the number of requests that can be served in a certain time period (e.g., 1 second). Free space, memory (used, unused, cached) and/or processor utilization can also be monitored. The memory may be primary and/or secondary storage. Metrics may be broken out by process and overall performance of the server. In some embodiments, network communications can also be monitored as a metric, including speed of network communication, network bytes read/written per time period, and the like. Time-based usage of server resources may also be measured as a metric, such as times of peak use, times of resource availability, and others.

In one embodiment, the server monitors its own metrics and provides this information to the system. In another embodiment, the system externally monitors the server metrics. In further embodiments, both the server and an external monitor track one or more metrics for efficiency and quality assurance checks. In an embodiment, the metrics are monitored continuously. In other words, the system is constantly receiving a stream of metrics from one or more of the servers. In some embodiments, the system is intermittently receiving the metrics, such as on a regular schedule or when events occur (e.g., communication events) that trigger a monitoring event. In an embodiment, the monitoring occurs during communication of other type of information. For example, servers may transmit information on metrics when other information is being transferred between servers. In one embodiment, the servers tracks its own metrics and then provides these metrics to the system during a communication event.

When a metric is termed associated with server performance, variation in the metric is correlated to variation in the speed, accuracy, and/or efficiency of the server in performing tasks or calculations. For example, processing speed may be a metric associated with server performance. The processing speed may affect the speed at which applications are implemented or calculations are performed. Another example of a metric associated with server performance is free memory. Again, free memory may be related to the ability of the server to efficiently perform more than one action at a time and therefore be related to server performance.

When a metric is termed associated with server communication, variation in the metric is correlated to communication speed, consistency, and/or clarity between the server and an external site. An example of a metric associated with server communication is bits per second of communication. As the bits per second changes between the monitored server and the external site, the server communication speed changes and the entire system and/or network may have higher efficiency.

In some embodiments, the metrics that are monitored for the plurality of servers are stored in a database. The raw data associated with the metrics may be stored or a summary of the metrics may be stored. In an embodiment, the summary permits comparison between the servers as well as comparison to objective criteria of performance, e.g., a minimum processing speed of X or the like.

In block 230, the system receives a request to deploy an application on at least one of the servers. In some embodiments, the application is a program that will be executed on the server once deployed. As is known in the art, an application may be a software application that implements or causes to be implemented various actions via the hardware and software associated with the processing device system. The application may be a stand-alone application or an element of a larger application.

In an embodiment, the request is received from a user, such as an application developer or systems operator. For example, a user of the system may have developed a new or improved application that will be implemented on at least one of the servers in the network. The user may have developed an application that provides internal analysis for the institution operating the network, e.g., determining interest rates for customers based on various criteria, and the user desires to deploy the application so that it may be used by one or more employees of the institution. In some embodiments, the request may be received from an external computing device processor. For example, an automatic updating process may have determined that an application on the network should be updated to a new version. The external computing device may send the request to deploy the updated application to the one or more servers.

In an embodiment, deploying means sending to and installing an application on a server so that the application may be executed or accessed at some point in the future. In some embodiments, multiple servers already have the application installed but the application requires additional action before the application is capable of executing. For example, the application may need a license number, update, or input that permits the application to execute on the server. In this situation, deploying means providing the input that permits the application to execute on the server.

In an embodiment, the application is deployed to a single server on the network. In some embodiments, an application will be deployed to more than one server on the network. For example, an application may be deployed on a certain percentage of the servers on the network or on all servers meeting specific criteria across the network. This may be to provide redundancy, increase access to the application by all users of the network, or for other reasons. In another embodiment, an application may be separated into component parts that are deployed to multiple servers but work together over the network in order to execute the functions of the application.

In an embodiment, executed on the server means that the application will be run on the server and perform some action either on the server or via communication with another computing device processor on the network. For example, the application may analyze information received by the server on the server or the application may communicate the analyze information to another computing device processor over the network.

In block 240, the system receives prioritization criteria for the application. In some embodiments, the prioritization criteria rank the metrics in order of importance to the application. In an embodiment, prioritization criteria are one or more characteristics that are important for execution of the application. For example, processor speed may be the most important characteristic of a server for an application to execute on the server. The application may have large computational requirements and therefore a fast processor speed would be important for proper execution. In another example, free memory space is important to an application because the application requires accessing multiple amount and/or types of data. In this situation, free memory may be most important to the application for proper execution.

In some embodiments, more than one characteristic is received by the system. The multiple characteristics may be ranked in level of importance to the application. In some embodiments, the multiple characteristics are characterized as equally important. In some embodiments, one or more characteristics are listed as being of low or no importance to the execution of the application.

In some embodiments, the system receives the prioritization criteria from a user. For example, the system may receive the characteristics of a server or operating system for which the application is designed. In some embodiments, the system receives the prioritization criteria from a user based on a user testing the application in a test environment and determining which criteria or characteristics of the machine are important for the efficient or proper execution of the application. In still further embodiments, the system receives the criteria from a user when the user selects criteria or characteristics from a list provided to the user by the system. For example, the system may provide a list of available servers and relative, e.g., ranked, characteristics of the servers relative to other servers on the network or the system may provide a list of absolute characteristics, such as processing speed or memory utilization, of the servers on the network and allow the user to select characteristics or servers having the characteristics desired by the user. In some embodiments, the provided servers are merely examples of the variety of servers available on the server and do not represent a specific server but instead represent one of a type of servers available on the system. For example, different types of servers may have different base characteristics and the system may provide model types to the user when allowing the user to select characteristics for the prioritization criteria.

In some embodiments, the system receives a prioritization criteria based on analysis of performance of the application on one or more computing device processors. For example, the application may be run in a test environment wherein the characteristics of the processing device are varied and the performance of the application is evaluated as the characteristics are varied. In this manner, the system can determine which characteristics are important to the efficient and/or proper execution of the application. In still further embodiments, the system monitors performance of the application across multiple machines having different characteristics and evaluates the performance of the application across the different machines to determine which characteristics are important to the efficient and/or proper execution of the application.

In yet still further embodiments, the system receives prioritization criteria based on defaults for the type of application. For example, an application that is directed to receiving data from customers and storing that data in associated databases may be within a category relating to communication of large amounts of data across the network. For this type of category, memory and network access speed may be more important than processing speed because the application is receiving large amounts of data and transmitting that data over the network to proper databases. In a contrasting example, an application directed to calculating the put price for an option may be within a category relating to high-intensive calculations application. For this type of category, the default may place processing speed above network access speed. In some embodiments, the user selects a type of application and/or category for the application and the system selects a default set of prioritization criteria that are relevant to that category.

In block 250, the system determines a deployment server for the application based at least in part on the metrics and the prioritization criteria. In an embodiment, a deployment server is at least one server on the network on which the application will be installed. In an embodiment, the application is installed on only one server. For example, the application may be accessible over the network by users but be deployed to, installed on, and executed via a single server. In other embodiments, the application is installed in whole or in part on more than one server. For example, multiple copies of the application may be installed on different server. In another example, portions of the application are separated or copied from the application code making up part of the application and deployed to different servers. In this example, the separation may be for memory and or processing speed purposes, e.g., components of the application that are processing power-intensive may be deployed to a server with a fast processing speed.

In an embodiment, the server determines the deployment server or servers based on a comparison of the metrics monitored for the plurality of servers on the network and the prioritization criteria for the application. For example, the system may identify the most important characteristic for the application based on the prioritization criteria and then find the server that best meets the characteristic. In some embodiments, the system determines the deployment server based on an algorithm that considers more than one characteristic identified as important to the application based on the prioritization criteria. For example, the algorithm may weight the prioritization criteria and determine the deployment server based on the weighted criteria and the monitored metrics. In some embodiments, the system makes the best match with a server base on all of the prioritization criteria. For example, the prioritization criteria may list processing speed as first in importance, memory utilization as second in importance, and network access speed as third in importance. A server on the network may have the highest processing speed but comparatively low memory utilization and network access speed relative to a second server on the network. In this example, the system may determine that the second server is the deployment server because the based on a consideration of all of prioritization criteria, it is the best fit. It should be understood that various methods of determining a deployment server based on prioritization criteria are possible and not limited to the examples disclosed herein. The system and method permits users to provide guidance in the deployment process so that applications are installed on servers that are best fitted to their execution.

In some embodiments, additional information is included in the determination of the deployment server. For example, the effect on the deployment server and/or the network may be considered. When an application is deployed to a server, the application may use resources in such a manner that the server is negatively affected. In some embodiments, the predicted effect on the server is considered when determining the deployment server. For example, a user may input an applications effect on a server when requesting that the application be deployed, or the system may measure the application's effect on a server during testing of the application. This information may be used to determine the deployment server. In some embodiments, the metrics associated with the servers are used to determine the application's effect on the server. For example, a server having a maximum processing capacity at some point in the day because of a short period of time wherein the server is highly utilized (e.g., a server that handles payroll deposits at midnight), may otherwise be an appropriate server for deployment but installation of the application would cause the server to have very little processing capacity at midnight. In this example, the server would be negatively affected because of a characteristic of the server even though the metrics associated with the server and the prioritization criteria associated with the application indicate the server would be appropriate for deployment.

In some embodiments, the effect on the network is considered. For example, deployment of an application that is network communication intensive may cause the entire network or portions of the network to slow down because of excessive amounts of data being transferred over the network. In this example, the application may instead be deployed to a server that is connected at higher rates or via a more direct route to the external or internal destinations of the application.

In some embodiments, the system informs the user of the server that has been determined as the deployment server. In some embodiments, the system informs the user that a deployment server has been identified. In further embodiments, the system informs the user of the metrics associated with the deployment server and/or the comparison of the prioritization criteria to the metrics. In still further embodiments, the system requests approval before deploying the application to the deployment server. Approval is not required in all embodiments and the system may also automatically deploy the application to the deployment server upon determination of the appropriate server.

In block 260, the system deploys the application to the deployment server. In an embodiment, the application is electronically sent to the server. In some embodiments, the application is installed on the server. In some embodiments, the application is executed on the server. At each of these steps, the system may inform or request approval from the user, although informing the user or receiving approval is not necessary in all embodiments. For example, the system may automatically send the application to the deployment server and automatically install the application on the deployment server, but request approval before executing the application on the deployment server.

In block 270, the system determines a network location identifier for the application on the network. In an embodiment, a network location identifier is a description of the location of the deployment server on the network. In some embodiments, the network location identifier is a known identifier to the user or a network administrator. For example, the network location identifier may describe the location based on the physical location, the computer name on the network, and/or the working group associated with the server.

In some embodiments, however, the network location identifier is obscured so that the user may be able to record information on the deployment or relocate the application if needed, but is not provided the location of the deployment in such a manner that the user knows the physical location of the server. For example, the identifier may obscure the location so that users do not know whether the application is installed on a server associated with their work group. In some environments, employees of an institution are resistant to other users installing applications on servers associated with a server managed or typically used by the employees. By obscuring the application deployment destination, the system reduces the chance that employees will object to deployment of the application on the server associated with the employee's work group.

In some embodiments, the network location identifier is determined based on the server address on the network. For example, a static IP address, a unique identifier for the hardware, the physical location, or the working group associated with the server will be used. In other embodiments, the location is obscured based upon an algorithm or randomly. In some embodiments, the obscured location is stored in a database in association with the identifiable location so that systems administrators may have a record of the location but the record is not available to all employees associated with the network. For example, the address may be determined similar to a URL redirector that provides a point of access for the application's users.

In some embodiments, the system continues to monitor the metrics and evaluates the effect of the installation on the server and network performance. In some embodiments, sending the application to the deployment server, installing the application on the server, and/or executing the application on the server has consequences on the performance of the server, the network, or related hardware or software. The system may continue to monitor the metrics associated with the servers, including the deployment server for the relevant application, to determine the effect of the deployment on the networked system.

In some embodiments, the system re-evaluates the deployment server. For example, the system may determine based on monitoring of the application after deployment that the execution of the application on the server results in unintended and/or unexpected consequences, e.g., the application may slow the execution of another application on the server to a degree that was not expected. In this situation, the system may inform the user of the effect of the application on the deployment server, offer to redeploy the application to a different server, or request additional prioritization criteria prior to re-deploying the application. In some embodiments, the effect of the application on the first server is incorporated into the system when determining a second deployment server.

In some embodiments, the system re-evaluates the performance of the application on the server and/or the effect of the application on the server. The system may regularly evaluate the performance. In some embodiments, the system re-evaluates the performance upon detection of a large system change, such as a change in the network speed, in order to match the deployment application to the proper server. In still further embodiments, the system re-evaluates the deployment server upon detection of a change in the application, such as a new version of the application. It should be understood that the system may be used for multiple applications and that each application deployment decision is operating in an environment where other applications are being deployed. In this manner, the system may also consider the deployment needs and effects of other applications on the deployment of the subject application.

Advantageously, the system permits a user to specify operating conditions for an application and then the system deploys the application in accordance with the operating conditions and the environment, i.e., server performance metrics, in which the application will be operating. In this manner, the system attempts to maximize performance of the application in view of the application's needs and the environment in which the application will be working. The system may also re-evaluate the deployment of the application in the environment in order to take into account changes in the working environment or application. In a still further embodiment, the system informs the user of the location but obscures the identification of the location in order to reduce objections by employees that may not desire the application to be installed on a server associated with the employees' working group.

In further embodiments, the system is configured to allow reports to be prepared regarding deployment, efficiency, and/or metrics associated with the networked servers. For example, a system administrator or developer may order a report regarding deployment of applications to servers so that the administrator may monitor deployment to various servers. In some embodiments, the report may be broken down by application, performance metric, server, or effect on server, network, or application performance. One skilled in the art would be able to devise additional reporting strategies given the disclosure provided herein.

Figure 3:
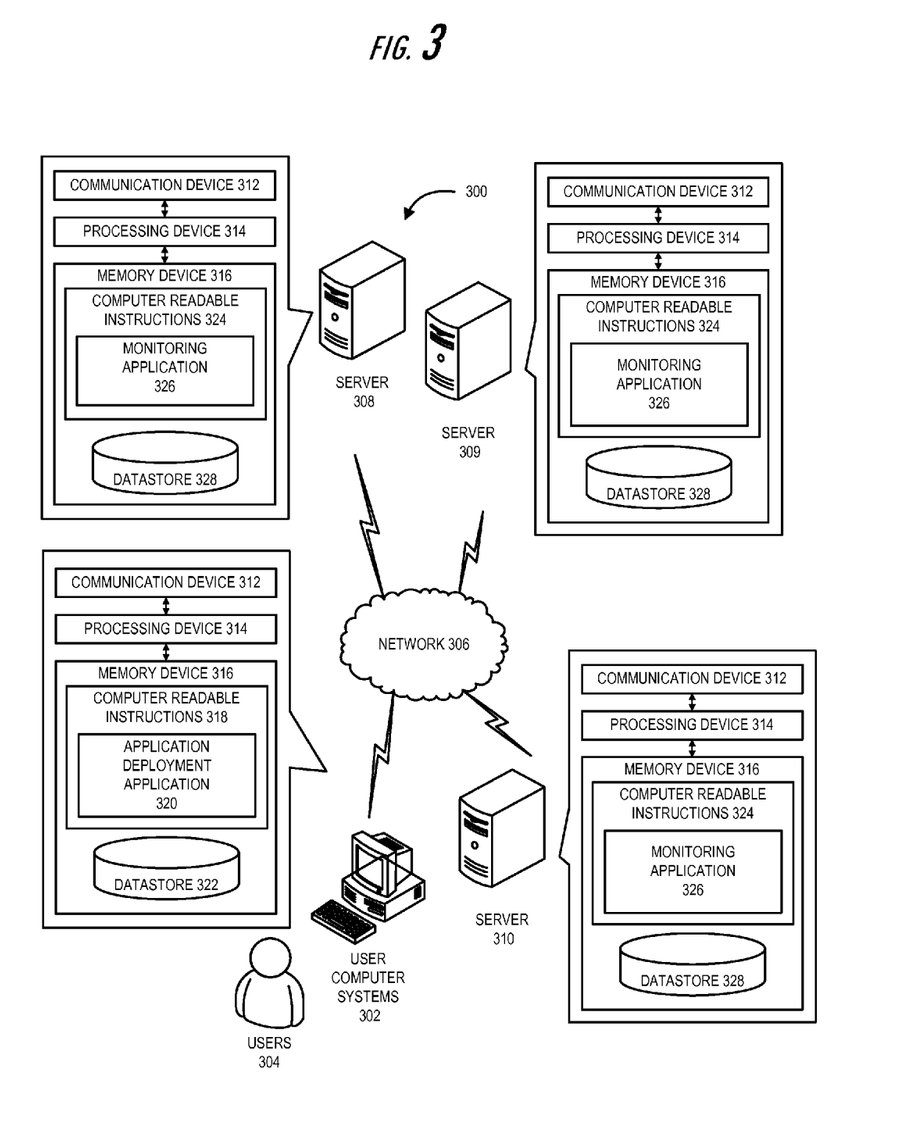
FIG. 3 provides illustrates a block diagram for an application deployment environment and system, in accordance with one embodiment of the present disclosure.

FIG. 3 illustrates a system 300 for deploying an application in a networked server environment, in accordance with an embodiment of the present disclosure. As illustrated in FIG. 3, the computer systems 302 of users 304 are operatively coupled, via a network 306, to a plurality of servers 308, 309, 310. In this way, the users 304 may utilize the user computer systems 302 to deploy applications to at least one of the servers 308, 309, 310 via the system. FIG. 3 illustrates only one example of embodiments of an application deployment system 300, and it will be appreciated that in other embodiments one or more of the systems (e.g., computers, mobile devices, servers, or other like systems) may be combined into a single system or be made up of multiple systems.

The network 306 may be a global area network (GAN), such as the Internet, a wide area network (WAN), a local area network (LAN), or any other type of network or combination of networks. The network 306 may provide for wireline, wireless, or a combination of wireline and wireless communication between devices on the network.

As illustrated in FIG. 3, the user computer systems 302 generally comprise a communication device 312, a processing device 314, and a memory device 316. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 314 is operatively coupled to the communication device 312 and the memory device 316. The processing device 314 uses the communication device 312 to communicate with the network 306 and other devices on the network 306, such as, but not limited to, the servers 308, 309, 310. As such, the communication device 312 generally comprises a modem, server, or other device for communicating with other devices on the network 306, and a display, camera, keypad, mouse, keyboard, microphone, and/or speakers for communicating with one or more users 304. The user computer systems 302 may include, for example, a personal device, which may be a personal computer, a laptop, a mobile device (e.g., phone, smartphone, tablet, or personal display device ("PDA"), or the like) or other like devices whether or not the devices are mentioned within this specification. In some embodiments, the user computer systems 302 could include a data capture device that is operatively coupled to the communication device 312, processing device 314, and the memory device 316. The data capture device could include devices such as, but not limited to a location determining device, such as a radio frequency identification ("RFID") device, a global positioning satellite ("GPS") device, Wi-Fi triangulation device, or the like, which can be used by a user 304, institution, or the like to capture information from a user 304, such as but not limited to the location of the user 304.

As further illustrated in FIG. 3, the user computer systems 302 comprises computer-readable instructions 318 stored in the memory device 316, which in one embodiment includes the computer-readable instructions 318 of an application deployment application 320 (e.g., an application that compares metrics for the servers 308, 309, 310 the prioritization criteria receives from the user 304). In some embodiments, the memory device 316 includes a datastore 322 for storing data related to the user computer system 302, including but not limited to data created and/or used by application deployment application 320, e.g., prioritization criteria and/or historical performance metrics for the servers.

As further illustrated in FIG. 3, the servers 308, 309, 310 generally include a communication device 312, a processing device 314, and a memory device 316. The processing device 314 is operatively coupled to the communication device 312 and the memory device 316. The processing device 314 uses the communication device 312 to communicate with the network 306, and other devices on the network 306. As such, the communication device 312 generally comprises a modem, server, or other device(s) for communicating with other devices on the network 306.

As illustrated in FIG. 3, the servers 308, 309, 310 include computer-readable program instructions 324 stored in the memory device 316, which in one embodiment includes the computer-readable instructions 324 of a monitoring application 326. In some embodiments, the memory device 316 includes a datastore 328 for storing data related to the servers 308, 309, 310, including but not limited to data created and/or used by the monitoring application 326. The monitoring application 326 monitors the performance of the servers before and, in some embodiments, after deployment of the application to at least one of the servers 308, 309, 310.

It is understood that the servers, systems, and devices described herein illustrate one embodiment. It is further understood that one or more of the servers, systems, and devices can be combined in other embodiments and still function in the same or similar way as the embodiments described herein.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present disclosure may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as, for example, a propagation signal including computer-executable program code portions embodied therein.

One or more computer-executable program code portions for carrying out operations of the present disclosure may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

Some embodiments of the present disclosure are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present disclosure.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the disclosure. Therefore, it is to be understood that, within the scope of the appended claims, the disclosure may be practiced other than as specifically described herein.

What is claimed is:

1. An apparatus for deploying an application in a networked server environment, whereby the apparatus monitors server metrics and deploys the application according to prioritization criteria associated with the application, the apparatus comprising:
  a memory;
  a computing processor; and
  a module stored in the memory, said module comprising instruction code executable by one or more computing processors, and configured to cause the one or more computing processors to:
    identify a plurality of servers connected via a network;
    monitor a plurality of metrics associated with each server in the plurality of servers, wherein the metrics are associated with server performance and server communication over the network, and wherein the metrics comprise CPU utilization, memory utilization, free disk space, processor speed, network bytes read per a period of time, and network bytes written per the period of time;
    receive a request to deploy an application on at least one of the servers, wherein the application is a program that will be executed on the server once deployed;
    receive prioritization criteria for the application, wherein the prioritization criteria rank the metrics in order of importance to the application, wherein the prioritization criteria are based on at least one correlation test of the application performed on each server of the plurality of servers when performance of each server is intentionally varied;
    compare the metrics and the at least one correlation test of the prioritization criteria;
    determine a deployment server from the plurality of servers for deployment of the application based at least in part on the comparison of the metrics and the at least one correlation test of the prioritization criteria, wherein the determination of the deployment server is further based at least in part on the effect of the application on the network; and
    deploy the application to the deployment server.

2. The apparatus of claim 1, wherein said module further comprises instruction code executable by one or more computing processors, and configured to cause the one or more computing processors to:
  monitor an effect of the deployment of the application to the deployment server; and
  re-deploy the application to a different deployment server.

3. The apparatus of claim 2, wherein the application is re-deployed to the different deployment server when the effect of the application on the deployment server is determined to be negative.

4. A computer program product for deploying an application in a networked server environment, whereby the computer program product monitors server metrics and deploys the application according to prioritization criteria associated with the application, the computer program product comprising:
  a non-transitory computer-readable medium comprising executable portions for causing a computer to:
    identify a plurality of servers connected via a network;
    monitor a plurality of metrics associated with each server in the plurality of servers, wherein the metrics are associated with server performance and server communication over the network, and wherein the metrics comprise CPU utilization, memory utilization, free disk space, processor speed, network bytes read per a period of time, and network bytes written per the period of time;
    receive a request to deploy an application on at least one of the servers, wherein the application is a program that will be executed on the server once deployed;
    receive prioritization criteria for the application, wherein the prioritization criteria rank the metrics in order of importance to the application, wherein the prioritization criteria are based on at least one correlation test of the application performed on each server of the plurality of servers when performance of each server is intentionally varied;
    compare the metrics and the at least one correlation test of the prioritization criteria;
    determine a deployment server from the plurality of servers for deployment of the application based at least in part on the comparison of the metrics and the at least one correlation test of the prioritization criteria, wherein the determination of the deployment server is further based at least in part on the effect of the application on the network; and
    deploy the application to the deployment server.

5. The computer program product according to claim 4, wherein the non-transitory computer readable medium further comprises executable portions for causing a computer to:
  monitor an effect of the deployment of the application to the deployment server; and
  a re-deploy the application to a different deployment server.

6. The computer-program product according to claim 5, wherein the application is re-deployed to the different deployment server when the effect of the application on the deployment server is determined to be negative.

7. A computer-implemented method for deploying an application in a networked server environment, whereby the method monitors server metrics and deploys the application according to prioritization criteria associated with the application, the method comprising:
  identifying a plurality of servers connected via a network;
  monitoring a plurality of metrics associated with each server in the plurality of servers, wherein the metrics are associated with server performance and server communication over the network, and wherein the metrics comprise CPU utilization, memory utilization, free disk space, processor speed, network bytes read per a period of time, and network bytes written per the period of time;
  receiving a request to deploy an application on at least one of the servers, wherein the application is a program that will be executed on the server once deployed;
  receiving prioritization criteria for the application, wherein the prioritization criteria rank the metrics in order of importance to the application, wherein the prioritization criteria are based on at least one correlation test of the application performed on each server of the plurality of servers when performance of each server is intentionally varied;
  comparing, via the computing device processor, the metrics and the at least one correlation test of the prioritization criteria;
  determining, via a computing device processor, a deployment server from the plurality of servers for deployment of the application based at least in part on the comparison of the metrics and the at least one correlation test of the prioritization criteria, wherein the determination of the deployment server is further based at least in part on the effect of the application on the network; and deploying the application to the deployment server.

8. The computer-implemented method of claim 7, further comprising:

monitoring an effect of the deployment of the application to the deployment server; and re-deploying the application to a different deployment server, wherein the application is re-deployed to the different deployment server when the effect of the application on the deployment server is determined to be negative.

* * * * *